Oct. 25, 1955  A. G. HELLSTRÖM  2,721,455
ABSORPTION REFRIGERATION
Filed Aug. 19, 1950  3 Sheets-Sheet 1
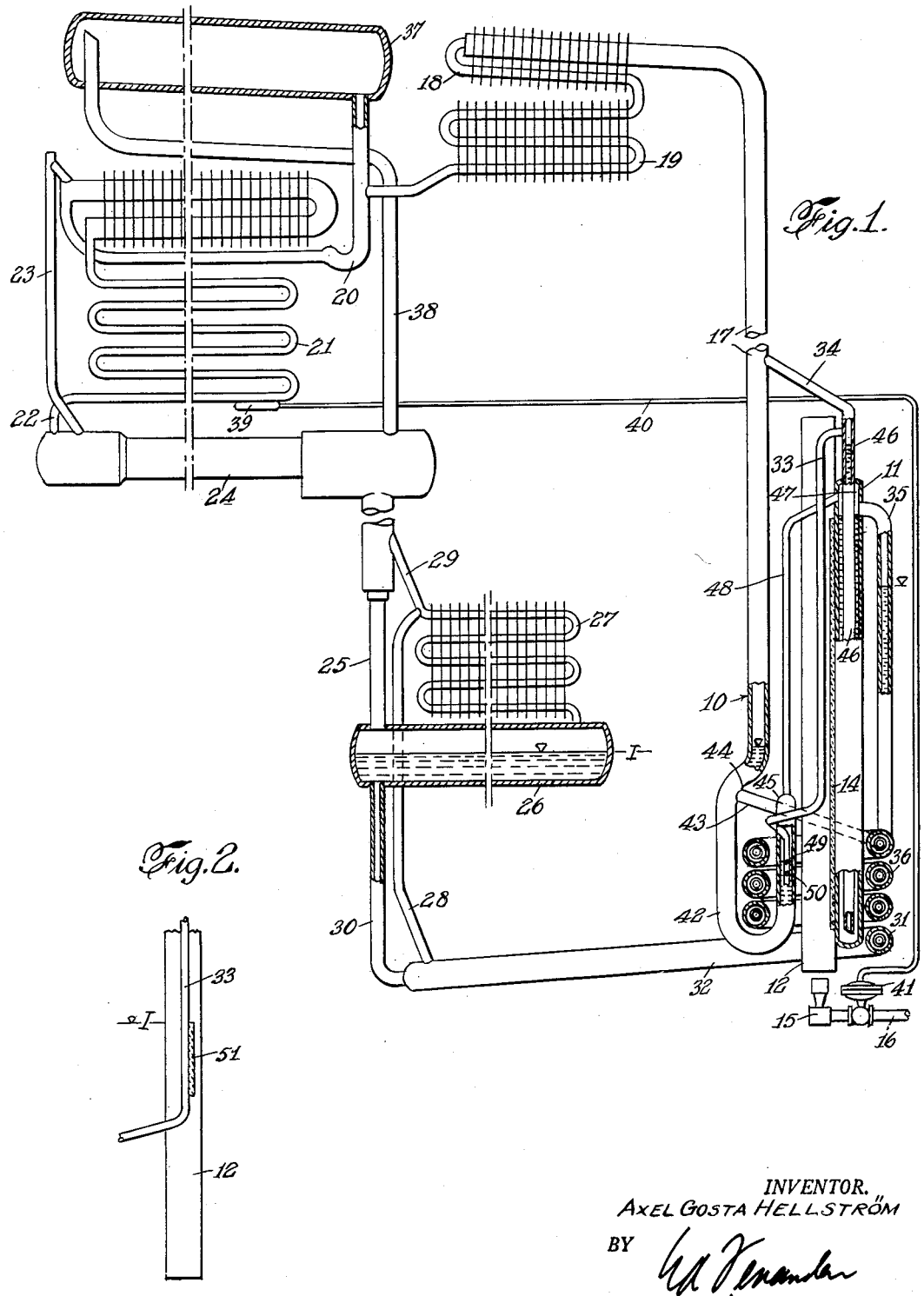
INVENTOR.
AXEL GÖSTA HELLSTRÖM
BY
his ATTORNEY.

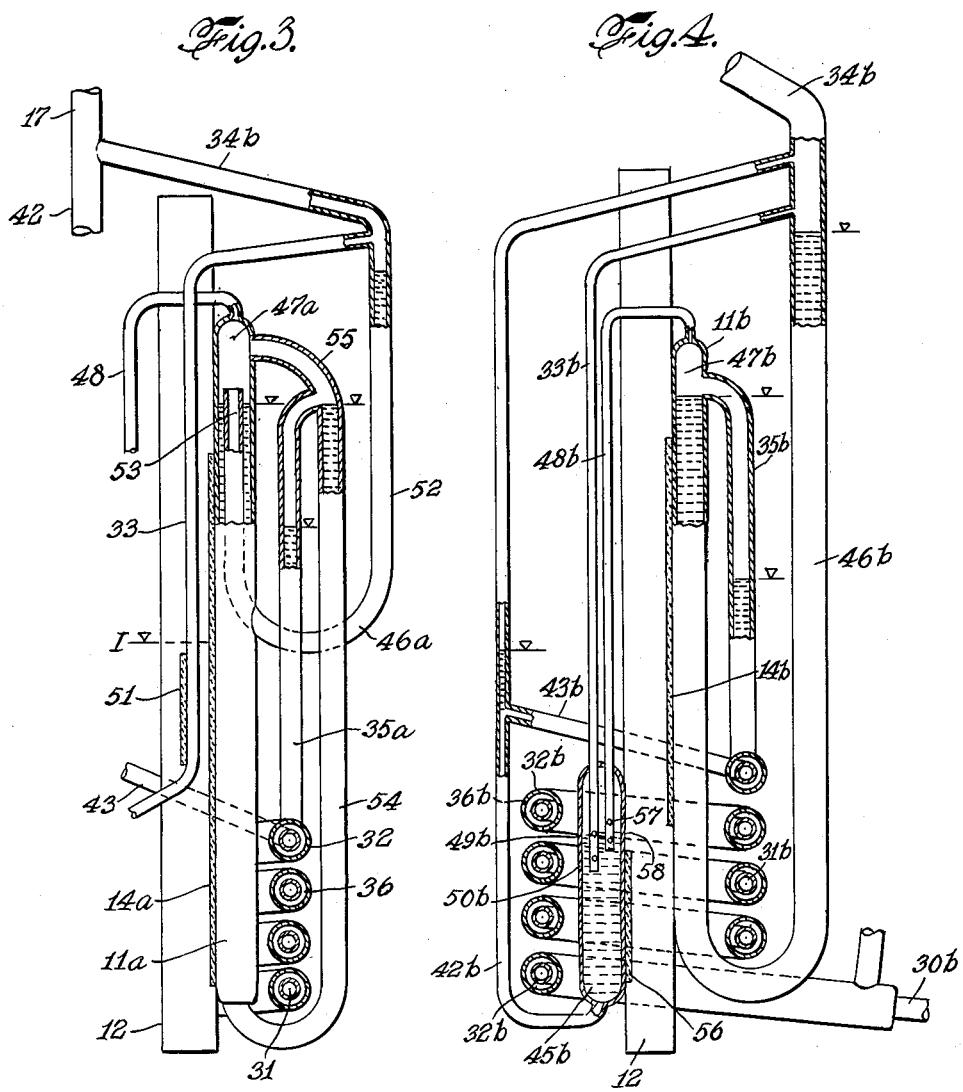

Oct. 25, 1955  A. G. HELLSTRÖM  2,721,455
ABSORPTION REFRIGERATION
Filed Aug. 19, 1950  3 Sheets-Sheet 3
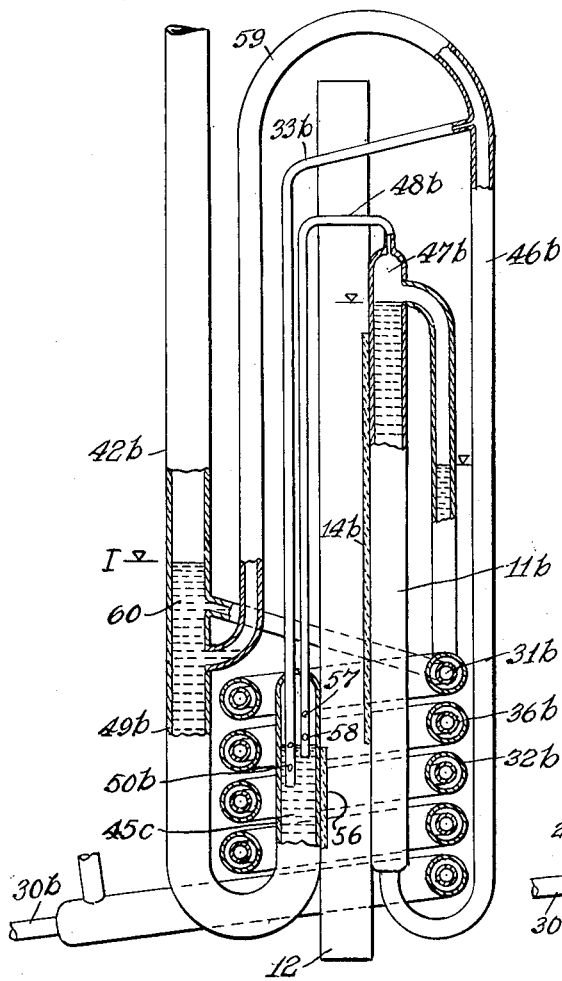
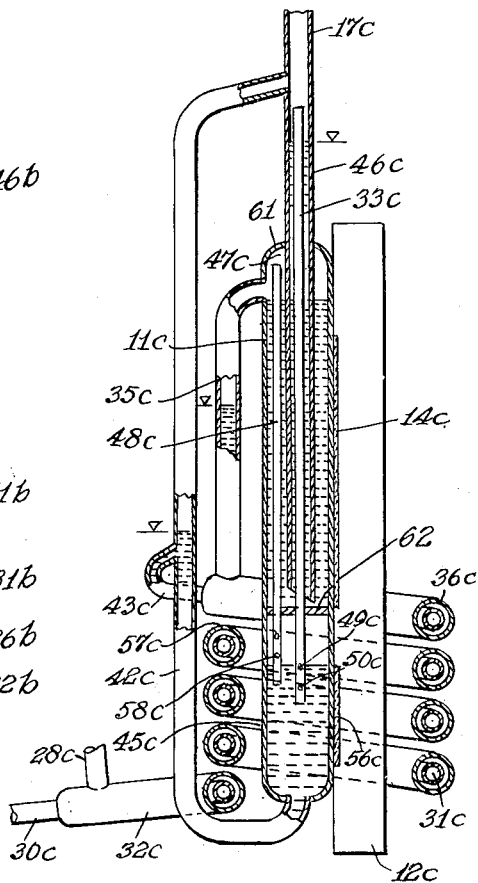
INVENTOR.
AXEL GOSTA HELLSTRÖM
BY
his ATTORNEY

United States Patent Office 2,721,455
Patented Oct. 25, 1955

2,721,455

ABSORPTION REFRIGERATION

Axel Gosta Hellström, Enskede, Sweden, assignor to Aktiebolaget Elektrolux, Stockholm, Sweden, a corporation of Sweden Application August 19, 1950, Serial No. 180,476

Claims priority, application Sweden August 25, 1949

16 Claims. (Cl. 62—119.5)

My invention relates to refrigeration systems of the absorption type and is especially useful in such systems employing an inert gas or pressure equalizing agent.

It is an object of my invention to effect improvements in the manner in which fluids are circulated in systems of this type, particularly to provide new arrangements for initiating and maintaining circulation of absorption solution over a wide range of heat input including periods of minimum heat input. More particularly, it is an object to provide such new arrangements in systems operated by a fluid fuel burner whereby circulation of absorption solution is readily maintained even when a thermostatic control functions to cause the burner to shift from normal or maximum flame operation to pilot or minimum flame operation. Further, it is an object to analyze generated vapor in a pump chamber which is connected to receive absorption solution enriched in refrigerant and from which chamber liquid is raised by vapor lift action by vapor formed in the boiler of the generator or vapor expulsion unit. In addition, provision may be made for transferring solution from the pump chamber to the boiler to initiate circulation of absorption solution in the event the boiler should be depleted of liquid following a shut down period.

The novel features which I believe to be characteristic of my invention are set forth with particularity in the claims. The invention, both as to organization and method, together with the above and other objects and advantages thereof, will be better understood by reference to the following description taken in connection with the accompanying drawings forming a part of this specification, and of which:

Fig. 1 diagrammatically illustrates an absorption refrigeration system embodying the invention;

Fig. 2 is a fragmentary view of a refrigeration system similar to that shown in Fig. 1 illustrating another embodiment of the invention; and Figs. 3 to 6 are fragmentary views of a refrigeration system like that shown in Fig. 1 illustrating further embodiments of the invention.

Referring to Fig. 1, I have shown my invention in connection with an absorption refrigeration system of a uniform pressure type which is well known in the art and in which an inert pressure equalizing gas is employed. Such a refrigeration system comprises a generator or vapor expulsion unit 10 including a generator or boiler 11 containing a refrigerant, such as ammonia, in solution in a body of absorption liquid, such as water. Heat is supplied to the boiler 11 from a heating tube or flue 12 thermally connected therewith at 14, as by welding, for example. The heating tube 12 may be heated in any suitable manner, as by a liquid or gaseous fuel burner which is adapted to project its flame into the lower end of the tube. In Fig. 1 the heating tube 12 is arranged to be heated by a gas burner 15 to which a suitable combustible gas is delivered through a conduit 16.

The heat supplied to the boiler 11 and its contents expels refrigerant vapor out of solution, and, in a manner to be described presently, the refrigerant vapor passes upwardly from the vapor expulsion unit 10 through a conduit 17 and through an air cooled rectifier 18 into an air cooled condenser 19 in which it is condensed and liquefied. Liquid refrigerant flows from condenser 19 through a conduit 20 into a cooling element 21 in which it evaporates and diffuses into an inert pressure equalizing gas, such as hydrogen, which enters through a conduit 22. Due to evaporation of refrigerant fluid into inert gas in cooling element 21, a refrigerating effect is produced which consequent absorption of heat from the surroundings.

The rich gas mixture of refrigerant vapor and inert gas formed in cooling element 21 flows from the upper part thereof through a conduit 23, one passage of a gas heat exchanger 24, conduit 25 and absorber vessel 26 into the lower end of an absorber coil 27. In absorber coil 27 the rich gas mixture flows countercurrent to downwardly flowing absorption liquid which enters through a conduit 28. The absorption liquid absorbs refrigerant vapor from inert gas, and inert gas weak in refrigeratnt flows from absorber coil 27 in a path of flow including a conduit 29, another passage of gas heat exchanger 24 and conduit 22 into the lower part of cooling element 21.

The circulation of gas in the gas circuit just described is due to the difference in specific weight of the columns of gas rich and weak, respectively, in refrigerant vapor. Since the column of gas rich in refrigerant vapor and flowing from cooling element 21 to the absorber coil 27 is heaver than the gas weak in refrigerant and flowing from the absorber coil 27 to cooling element 21, a force is produced or developed within the system for causing circulation of inert gas in the manner described.

Absorption solution enriched in refrigerant flows from the absorber vessel 26 through a conduit 30 and an inner passage or pipe 31 of liquid heat exchanger 32 disposed about the lower part of vapor expulsion unit 10. As will be described presently, liquid flows from the inner pipe 31 of the liquid heat exchanger into the lower end of a vapor lift pipe or tube 33 through which liquid is raised by vapor-liquid lift action to a higher level in the vapor expulsion unit 10. Refrigerant vapor expelled out of solution in boiler 11 flows upwardly from the vapor expulsion unit 10 through a conduit 34 to the condenser 19, as previously explained. The raised absorption liquid from which refrigerant vapor has been expelled flows from the boiler 11 through a conduit 35, outer pipe or passage 36 of liquid heat exchanger 32 and conduit 28 into the upper part of absorber coil 27. The circulation of absorption solution in the liquid circuit just described is effected by raising of liquid through pipe 33.

The outlet end of condenser 19 is connected by an upper extension of conduit 20, vessel 37 and conduit 38 to a part of the gas circuit, as at one end of gas heat exchanger 24, for example, so that any inert gas which may pass through the condenser 19 can flow into the gas circuit. Refrigerant vapor not liquefied in the condenser flows through the upper part of conduit 20 to displace inert gas in vessel 37 and force such gas into the gas circuit. The effect of forcing gas into the gas circuit in this manner is to raise the total pressure in the entire system, whereby an adequate condensing pressure is obtained to insure condensation of refrigerant vapor in condenser 19.

The refrigeration system just described may be controlled by a thermal bulb 39 which is affected by a temperature condition of cooling element 21. As shown, the thermal bulb 39 is arranged in thermal exchange relation with the bottom part of cooling element 21 and connected by a conduit 40 to a control device 41 which is connected in the fuel supply conduit 16. The thermal bulb 39 and conduit 40 may form part of an expansible fluid thermostat which is charged with a suitable volatile fluid for operating the control device 41 with changes in temperature of cooling element 19, in a manner well known in the art.

When the temperature of cooling element 21 increases due to an increase in load on the cooling element, thermal bulb 39 becomes effective to operate control device 41 to increase the supply of fuel to burner 15 whereby the latter operates with a normal or maximum flame and heat is supplied at "maximum" heat input to the vapor expulsion unit 10. Under these conditions refrigerant vapor is expelled from solution in vapor expulsion unit 10 at an increased rate, thereby increasing the amount of refrigerant vapor which condenses in condenser 19 and flows into cooling element 21.

Conversely, when the temperature of cooling element 21 decreases, the thermal bulb 39 becomes effective to operate control device 41 to decrease the supply of fuel to burner 15 whereby the latter operates with a pilot flame and heat is supplied at a "minimum" or reduced heat input to the vapor expulsion unit 10. Under these conditions, the rate at which refrigerant vapor is expelled out of solution in the vapor expulsion unit 10 is reduced, thereby decreasing the amount of refrigerant vapor which condenses in condenser 19 and flows into cooling element 21.

In accordance with my invention I provide an improved vapor expulsion unit of simplified construction for effectively initiating and maintaining circulation of absorption solution in the liquid circuit. The vapor expulsion unit includes a vertically extending pipe 42 connected to receive absorption solution enriched in refrigerant and flowing thereto from the absorber vessel 26 and inner pipe 31 of liquid heat exchanger 32. Such enriched absorption solution passes from the inner pipe 31 of the liquid heat exchanger through a conduit 43 into the pipe 42 at a point 44 which is at a level below the liquid level in the absorber vessel 26 and the level of the column of liquid contained in the pipe 42.

The lower end of pipe 42, which is bent back upon itself and more or less U-shape, provides an upstanding part 45 which serves as a pump chamber and cooperates with the tube or pump pipe 33 for raising enriched absorption solution to a higher level by vapor-liquid lift action in a manner to be explained presently. The raised liquid passes into the upper end of a standpipe 46 which extends downwardly within the boiler 11 and into the lower closed end of which enriched absorption solution discharges from the lower open end of standpipe 46.

The heating tube 12 heats enriched absorption solution in the boiler or pipe 11 to cause expulsion of refrigerant vapor from solution. The principal part of the generated vapor produced in the vapor expulsion unit 10 is expelled from solution in the boiler or pipe 11, and liquid of decreasing concentration flows upwardly in the boiler or pipe 11 in the annular chamber formed about the standpipe 46 disposed therein. Absorption solution weak in refrigerant flows from the upper part of boiler 11 into conduit 35 and passes therefrom by gravity flow through the outer passage 36 of liquid heat exchanger 32 and conduit 28 into the upper end of absorber coil 27, as previously explained.

Vapor expelled from solution in the boiler or pipe 11 passes upwardly therein and flows from the vapor space 47 in the upper part thereof through a conduit 48 into the pump chamber 45. The lower end of the lift tube or pump pipe 33 is positioned within the pump chamber 45 and formed with a plurality of openings 49 and 50 at different levels in the side wall thereof. The vapor flowing downwardly through conduit 48 acts upon and depresses the liquid level in chamber 45 and the liquid in the upper part of the chamber is repeatedly segregated in a well known manner by the vapor whereby slugs of liquid are raised in the lift tube or pump pipe 33 by vapor-lift action. The internal diameter of pump pipe 33 is sufficiently small so that vapor bubbles cannot freely pass liquid therein.

The opening 49 is slightly above the normal liquid level that is maintained in chamber 45. In the event the opening 49 becomes clogged, the liquid level will be forced down until the opening 50 is uncovered and the latter will function to effect lifting of a column of liquid slugs and vapor under the influence of a reaction head formed by the liquid column in the pipe 42. The lifting vapor is separated from the raised liquid at the upper end of standpipe 46 and flows through conduit 34 into conduit 17 to which the upper part of pipe 42 is also connected for venting any vapor which may pass therein from the liquid heat exchanger passage 31.

In view of the foregoing it will now be understood that generated vapor produced in boiler 11 is effectively utilized to raise liquid by vapor-liquid lift action in the lift tube or pump pipe 33. The generated vapor usually is a mixture of refrigerant vapor and absorption liquid vapor; and, when ammonia and water are employed as the refrigerant and absorption liquid, for example, the generated vapor usually is a mixture of ammonia vapor and water vapor. Due to the difference in boiling points of ammonia and water, the water vapor may be removed from ammonia by cooling the mixture to condense out the water. In Fig. 1 this is accomplished by spacing from the heating tube 12 the pump chamber 45 through which all of the generated vapor passes.

The absorption liquid introduced into the pump chamber 45 and raised in pump pipe 33 is relatively rich in refrigerant and at a lower temperature than the generated vapor, and, in coming in intimate contact with the enriched absorption solution, the water vapor is cooled sufficiently and condenses and in this way is removed from the ammonia vapor. The latent heat of condensation resulting from condensation of water vapor is given up to the enriched absorption solution whereby some ammonia vapor is expelled out of solution. Such expelled refrigerant vapor mixes with refrigerant vapor generated in the boiler 11, and the mixture passes upwardly through pump pipe 33 and conduits 34 and 17 to the condenser.

Under certain conditions the boiler 11 may be depleted of liquid and no vapor can be generated therein to initiate circulation of liquid in the absorption solution circuit when operation of the gas burner 15 is started following a shut down period. This may occur, for example, when the refrigeration unit is tilted while being transported from one place to another. Under such conditions the absorber vessel 26 is bound to hold absorption solution which will also reach the pipe 42 and pump pipe 33 by reason of the free communication of these pipes with the absorber vessel. Accordingly, the free liquid level in pipe 42 and pump pipe 33 will always be substantially the same as the liquid surface level in the absorber vessel 26 when the system is initially placed in operation following a shut down period. In order to initiate circulation of liquid in the absorption solution circuit when the boiler 11 is depleted of liquid, the lift tube or pump pipe 33 may be heat conductively connected at 51 to the heating tube 12, as by welding, for example, in the manner shown in Fig. 2.

It will be understood that the lengthwise heat conductive connection of pump pipe 33 to heating tube 12 at a region below the liquid level I desirably is as short as possible and its only purpose is to initiate lifting of liquid in the pump pipe when the boiler 11 is depleted of liquid following a shut down period. In this manner heat is supplied from heating tube 12 to pump pipe 33 to expel vapor from solution therein whereby such vapor will be effective to initiate lifting of liquid and eventually build up a body of liquid in boiler 11. During normal operation when the generated vapor produced in boiler 11 is employed to effect lifting of liquid in pump pipe 33, the rising liquid and lifting vapor momentarily pass through a heated zone of the pump pipe in heat conductive connection with the heating tube 12. However, in the embodiment of Fig. 2 the pump chamber 45 is still spaced from the heating tube 12 and hence will function as an analyzer in the same manner described above in connection with the first described embodiment.

In both Figs. 1 and 2 the thermostatic control desirably is adjusted so that generated vapor is produced in boiler 11 when heat is supplied at "minimum" heat input rate to the vapor expulsion unit 10. Even when generated vapor is produced in boiler 11 under such minimum heat input conditions, sometimes referred to as "off" periods of operation when the cooling element 21 reaches a desired low temperature, the supply of refrigerant to the cooling element nevertheless is reduced sharply to effect the desired thermostatic control in the manner previously described. By generating vapor in boiler 11 during the periods of minimum heat input the temperature at which the generator or vapor expulsion unit is maintained can be materially reduced and lowered. Not only is there the advantage of maintaining such a low generator temperature but tests consistently show that, when the thermostatic control again functions to supply heat at maximum heat input to the heating tube 12, the production of generated vapor in boiler 11 picks up very fast and hence decreases the length of time necessary to supply liquid refrigerant at a faster rate to the cooling element to satisfy the increase in load thereon.

Since the pump chamber 45 is not in direct heat conductive connection with the heating tube 12 in the emmodiments of Figs. 1 and 2, the pump chamber does not constitute a vapor forming region which functions to initiate pumping of liquid by vapor-liquid lift action. The heat transmitted to the pump chamber 45 by the vapor flowing therein through conduit 48 is ineffective to cause any appreciable vaporization of absorption solution in the pump chamber, and the solution therein will remain enriched in refrigerant and the refrigerant concentration thereof will not be reduced. Hence, the pump chamber 45 can effectively function as an analyzer and the necessity of employing special provisions whose only purpose would be to effect analyzing of generated vapor is avoided.

In the embodiments just described it will be seen that the vapor expelled from solution in boiler 11 leaves the vapor space 47 in thermal equilibrium with absorption solution weak in refrigerant. The refrigeration system can also be arranged so that generated vapor passes from the generator or vapor expulsion unit in thermal equilibrium with absorption solution enriched in refrigerant. Such a modification is shown in Fig. 3 in which only the parts at the right-hand side of heating tube 12 are illustrated, the parts at the left-hand side of the heating tube which have not been shown being the same as those seen in Fig. 1. In Fig. 3, in which parts similar to those shown in Figs. 1 and 2 are referred to by the same reference numerals, heat is supplied to boiler 11a from the heating tube 12 thermally connected therewith at 14a, as by welding, for example. Refrigerant vapor expelled out of solution in boiler 11a passes from the upper vapor space 47a thereof through the conduit 48 to the pump chamber (not shown) in the manner described above in connection with the embodiment of Fig. 1.

From the pump chamber absorption solution is raised by vapor-liquid lift action through conduit 33 into one arm 52 of a U-shaped standpipe 46a, the other arm 53 of which is disposed in the boiler 11a and whose open end terminates in the vapor space 47a. The lifting vapor separates from the raised liquid at the upper end of arm or pipe 52 and flows through conduits 34b and 17 to the condenser in the manner previously described in connection with Fig. 1. Since absorption solution enriched in refrigerant is introduced into the upper end of pipe 52, it will be evident that the vapor passes from the upper end of such pipe in thermal equilibrium with rich absorption solution.

The rich absorption solution overflows from the upper end of the arm or pipe 53 into the upper part of boiler 11a, and such solution becomes heated to cause expulsion of refrigerant vapor therefrom. Liquid of decreasing concentration flows downwardly in the boiler 11a and thence upwardly through a conduit 54. Absorption solution weak in refrigerant passes from the upper end of conduit 54 through a conduit 35a whose lower end is connected to the outer passage or pipe 36 of liquid heat exchanger 32. Such weak absorption solution flows by gravity to the upper part of the absorber coil (not shown) in the same manner weak solution is returned to absorber coil 27 in Fig. 1. The extreme upper end 55 of conduit 54 communicates with the vapor space 47a of boiler 11a, so that the liquid levels in the boiler 11a and conduit 54 will remain substantially the same and any likelihood of heated liquid overflowing into the upper end of arm 53 is avoided.

In Fig. 1 vapor is expelled from solution in standpipe 46 as well as in boiler 11 due to heating of liquid in the standpipe by the heating tube 12. Vapor expelled from solution in standpipe 46 passes upwardly through conduits 34 and 17 to the condenser 19. Hence, the concentration of refrigerant in the absorption solution introduced into the lower end of boiler 11 is less than the concentration of the solution raised through the lift tube or pump pipe 33. In the modification of Fig. 3 the concentration of refrigerant in the absorption solution introduced into the upper end of the boiler 11a is the same as that of the solution raised through the lift tube 33, and all of the vapor generated in the vapor expulsion unit from raised solution passes through conduit 48 to the pump chamber to effect lifting of liquid from one level to a higher level.

Another embodiment is shown in Fig. 4 in which parts similar to those illustrated in Fig. 1 are referred to by the same reference numerals. In Fig. 4 heat is supplied to boiler 11b from the heating tube 12 thermally connected therewith at 14b. Refrigerant vapor expelled out of solution in boiler 11b passes from the upper vapor space 47b thereof through the conduit 48b to the pump chamber 45b. Absorption solution enriched in refrigerant is conducted from the absorber vessel through conduit 30b, inner passage 31b of liquid heat exchanger 32b, conduit 43b and conduit 42b to the pump chamber.

The lift tube or pump pipe 33b is formed with openings 49b and 50b in the lower end thereof and liquid is raised therethrough by vapor-liquid lift action in the manner previously explained. The raised liquid passes into the upper end of one arm of a U-shaped pipe which servies as the standpipe 46b, the other arm of which constitutes the boiler 11b. Liquid of decreasing refrigerant concentration flows upwardly in boiler 11b and overflows from the upper end thereof into conduit 35b through which weak solution flows to the upper part of the absorber coil in the same manner as previously described in Fig. 1. The vapor separated from liquid at the upper end of standpipe 46b flows through conduit 34b to the condenser, the upper extension of conduit 42b also communicating with the upper end of standpipe 46b.

Fig. 4 differs from the embodiments of Figs. 2 and 3 in that the lift tube 33b is out of heat conductive connection with the heating tube 12. However, provision is made in Fig. 4 to initiate circulation of liquid in the absorption solution circuit in the event the boiler 11b is depleted of liquid following a shut down period. This is accomplished by heat conductively connecting the pump chamber 45b to the heating tube 12 at 56, as by welding, for example. Such heat conductive connection 56 desirably extends lengthwise of the pump chamber 45b along the liquid containing portion thereof and the vapor space preferably is out of direct thermal contact with the heating tube 12.

Normally the liquid level in the pump chamber 45b of Fig. 4 is about at the level of the upper opening or port 49b in the lift pipe 33b. Under these conditions liquid is being raised through conduit 33b by vapor-liquid lift action by virtue of the fact that vapor is being expelled from solution in boiler 11b and such vapor flows through conduit 48b to the pump chamber 45b. When the boiler 11b is depleted of liquid and absorption solution is held in other parts of the absorption solution circuit, the liquid then rises in pump chamber 45b to a higher level which is substantially the same as the liquid level in the absorber vessel with which the pump chamber freely communicates. At the higher liquid level in pump chamber 45b both of the ports or openings 49b and 50b are immersed in liquid, such liquid level then being above the level of two openings 57 and 58 formed in the side wall of conduit 48b.

In the absence of vapor flow through conduit 48b from boiler 11b when the refrigeration system is placed in operation following a shut down period, and the thermostatic control is functioning to supply heat at maximum heat input inasmuch as the cooling element is at the ambient temperature of the surroundings, vapor is expelled from solution in pump chamber 45b by virtue of the heat conductive connection 56 between such chamber and the heating tube 12. The vapor formed in pump chamber 45b depresses the liquid level therein to the region of opening 57 and liquid is then raised through conduit 48b by vapor lift action in the same manner that liquid is normally raised through conduit 33b. The raised liquid is conducted into boiler 11b which gradually fills up with absorption solution. Vapor is expelled from solution in the liquid body collected in boiler 11b by heat derived from heating tube 12, and such vapor then flows downwardly through conduit 48b whereby normal pumping and raising of liquid through pump pipe 33b is initiated.

In the embodiment of Fig. 4 the heat conductive connections 14b and 56 only extend alongside the liquid containing portions of boiler 11b and pump chamber 45b, respectively. Further, the heat conductive connection 56 may be of such a character that the heating tube 12 will supply heat to the liquid body in pump chamber 45b at a reasonable rate to cause expulsion of vapor therefrom when heat is supplied at the maximum heat input rate to the heating tube.

The embodiments previously described all lend themselves to the provision of a submerged analyzer when this is deemed desirable. This is shown by way of example in Fig. 5 which is generally similar to Fig. 4 with corresponding parts designated by the same reference numerals. Fig. 5 differs from Fig. 4 in that vapor does not flow directly to the condenser from the upper end of standpipe 46b but instead flows through a conduit 59 having its upper end connected to standpipe 46b and its lower end connected to conduit 42b at a region below the liquid level I therein. The region 60 of conduit 42b serves as an analyzer into which vapor from conduit 59 is introduced and analyzed in the manner previously explained. Refrigerant vapor bubbling through liquid in the conduit 42b then passes to the condenser in which it is liquefied, as explained above in connection with Fig. 1.

Fig. 6 illustrates a further embodiment of the invention in which the vapor expulsion unit or generator is formed with a minimum number of parts and welded connections. In Fig. 6 the boiler 11c and pump chamber 45c comprise a single shell or pipe of piping 61 having a partition 62 therein through which the pump pipe 33c and conduit 48c extend downwardly into the pump chamber. The normal liquid containing portions of the shell 61 are heat conductively connected at 14c and 56c, respectively, to the heating tube 12c.

Absorption liquid enriched in refrigerant flows from the absorber through conduit 30c, inner passage 31c of liquid heat exchanger 32c, conduit 43c and vertical conduit 42c into the bottom part of pump chamber 45c. Vapor generated in boiler 11c flows into pump chamber 45c through conduit 48c from the vapor space 47c of the boiler. Liquid is raised by vapor-liquid lift action through lift tube 33c into the upper part of standpipe 46c which is disposed about the lift tube and extends downwardly within the boiler 11c. Absorption solution passes from the lower end of standpipe 46c into the boiler, and liquid of decreasing refrigerant concentration flows upwardly in the boiler.

Liquid weak in refrigerant overflows from the upper part of boiler 11c into conduit 35c and is conducted therefrom through the outer passage 36c of liquid heat exchanger 32c and conduit 28c to the upper part of the absorber, as explained above in connection with Fig. 1. As in the embodiment of Fig. 4 the conduit 48c is formed with openings 57c and 58c in the lower part thereof and this conduit is so positioned with respect to the lift tube 33c that it can be employed as a pump pipe to transfer liquid to boiler 11c in the event the latter is depleted of liquid, in the same manner previously explained in connection with Fig. 4.

Modifications of the embodiments of my invention which I have described will occur to those skilled in the art, so that I desire my invention not to be limited to the particular arrangements set forth. For example, the embodiment of Fig. 3 may be employed without the provision of heat conductively connecting the lift tube or pump pipe to the heating tube. Also, the standpipe 46b in Figs. 4 and 5 may be arranged in the same manner as the standpipe 46 in Fig. 1. When all of the vapor generated in the boiler is utilized to effect lifting of liquid, as in the embodiment of Fig. 3, excessively rapid pumping or raising of liquid may sometimes occur. Hence, the embodiment of Fig. 1 may possess certain advantages in certain instances by heating standpipe 46 and causing expulsion of vapor which passes directly therefrom to the condenser without being employed to raise liquid by vapor lift action. Similarly, in the other embodiments like Figs. 3, 4 and 5, for example, the standpipe arranged to receive raised absorption solution may have a portion thereof heat-conductively connected to the heating tube to cause some expulsion of vapor therefrom for flow directly to the condenser in the manner described in the embodiment of Fig. 1. Further, in the different embodiments the conduits 42, 42a, 42b and 42c may be omitted and enriched absorption solution can then be conducted to the pump chamber directly from the upper end of the liquid heat exchanger. Therefore, I intend in the claims to cover all those modifications which do not depart from the spirit and scope of my invention.

What is claimed is:

1. The method of circulating absorption solution through and between a place of heating and a place of absorption which comprises flowing absorption solution enriched in refrigerant from said place of absorption by gravity to a place at one level, expelling vapor from solution at said place of heating, flowing such expelled vapor to said place at one level for repeatedly segregating solution therein to form slugs of liquid which are raised by vapor-lift action with said expelled vapor in a path of flow extending upwardly from said one level to a higher level, conducting raised solution to said place of heating, flowing absorption solution weak in refrigerant from said place of heating to said place of absorption, flowing the absorption solution by gravity from said place of absorption only to said place at one level and maintaining a liquid surface in the latter insufficiently high to flow therefrom by gravity to said place of heating when expulsion of vapor from solution at said place of heating is substantially terminated, heating a region of said path of flow through which solution is raised by vapor-lift action from said one level to said higher level, such region normally containing solution from said place of absorption when expulsion of vapor at said place of heating is substantially terminated, and, when the flow of expelled vapor from said place of heating to said place at one level becomes reduced, expelling vapor from said solution in said region by heating effected at such region to raise solution by vapor lift action from said one level to said higher level, especially when said place of heating is depleted of absorption solution and ineffective to supply vapor to said place at one level when heating is effected at said place of heating following a shut-down period.

2. The method set forth in claim 1 which includes the step of employing a common source of heat which is thermally segregated from said place at one level for heating said place of heating and said region through which solution is raised in said path of flow from said place at one level to said higher level.

3. The method set forth in claim 1 which includes the steps of separating the vapor from the raised solution and flowing such vapor to a place of liquefaction, flowing condensate from the place of liquefaction to a place of cooling, controlling the source of heat in accordance with a temperature condition affected by the place of cooling to vary the heat input to said place of heating, supplying heat to the place of heating from the source of heat at a minimum heat input limit when the place of cooling is at a desired low temperature, and effecting expulsion of vapor at said place of heating at a reduced rate at said minimum heat input limit even when said place of cooling is at the desired low temperature.

4. In an absorption refrigeration system having a vapor supply line, a circuit for circulation of absorption solution including an absorber and a vapor expulsion unit comprising a vertically extending pipe forming a boiler member, means including a vertically extending heating tube for heating absorption solution in said boiler member to expel vapor therefrom, the outer exterior wall surfaces of said heating tube and boiler member being heat conductively connected to one another, a first connection for conducting solution from the outlet of said absorber to said boiler member including a pump which is disposed alongside of and exteriorly of said heating tube, said pump comprising means forming a pump chamber and a riser pipe extending upwardly therefrom, said first connection providing a path for conducting solution by gravity from the outlet of said absorber only to said pump when the expulsion of vapor from solution in said boiler member is substantially terminated due to reduction in the supply of heat thereto, means for conducting vapor expelled from solution in said boiler member to said pump chamber to raise solution therefrom through said riser pipe by vapor lift action, said vapor supply line being connected to receive vapor from the upper end of said riser pipe, a second connection for conducting solution from said boiler member to the inlet of said absorber, and a heat conductive connection between the outer exterior wall surfaces of said heating tube and said pump, said last-mentioned heat conductive connection being only to a part of the exterior wall surface of said pump, along a vertically extending zone at an outer peripheral region of said pump which is below the liquid level in said absorber, to promote expulsion of vapor from solution in said pump and effect upward flow of solution in said riser pipe when the supply of vapors to said chamber from said boiler member is reduced and ineffective to circulate solution in said pump by vapor-lift action, especially when said boiler member is depleted of absorption solution and ineffective to supply vapor to said pump chamber when heating of said boiler member is resumed following a shut-down period.

5. In an absorption refrigeration system having a vapor supply line, a circuit for circulation of absorption solution including an absorber and a vapor expulsion unit comprising a pair of vertically extending pipes having the exterior wall surfaces thereof heat conductively connected to one another, one of said pipes forming a boiler member and the other serving as a heating tube, a first connection for conducting solution from the outlet of said absorber to said boiler member including a pump which is disposed alongside of and exteriorly of said heating tube, said pump comprising means forming a pump chamber and a riser pipe extending upwardly therefrom, said first connection providing a path for conducting solution by gravity from the outlet of said absorber only to said pump when expulsion of vapor from solution in said boiler member is substantially terminated due to reduction in the supply of heat thereto, means for conducting vapor expelled from solution in said boiler member to said chamber to raise solution therefrom through said riser pipe by vapor lift action, said supply line being connected to receive vapor from the upper end of said riser pipe, a second connection for conducting solution from said boiler member to the inlet of said absorber, and a heat conductive connection between the outer exterior wall surfaces of said heating tube and said riser pipe, said last-mentioned heat conductive connection being only to a part of the exterior wall surface of said riser pipe at an outer peripheral region thereof which is below the liquid level in said absorber to promote expulsion of vapor from solution in said pump and effect upward flow of solution in said riser pipe when the supply of vapors to said chamber from said boiler member is reduced and ineffective to circulate solution in said pump by vapor-lift action, especially when said boiler member is depleted of absorption solution and ineffective to supply vapor to said pump chamber when heating of said boiler member is resumed folowing a shut-down period.

6. In an absorption refrigeration system having a vapor supply line, a circuit for circulation of absorption solution including an absorber and a vapor expulsion unit comprising a pair of vertically extending pipes having the exterior wall surfaces thereof heat conductively connected to one another, one of said pipes forming a boiler member and the other serving as a heating tube, a first connection for conducting solution from the outlet of said absorber to said boiler member including a pump which is disposed alongside of and exteriorly of said heating tube, said pump comprising means forming a pump chamber and a riser pipe extending upwardly therefrom, said first connection providing a path for conducting solution by gravity from the outlet of said absorber only to said pump when expulsion of vapor from solution in said boiler member is substantially terminated due to reduction in the supply of heat thereto, means for conducting vapor expelled from solution in said boiler member to said chamber to raise solution therefrom through said riser pipe by vapor lift action, said supply line being connected to receive vapor from the upper end of said riser pipe, a second connection for conducting solution from said boiler member to the inlet of said absorber, and a heat conductive connection between the outer exterior wall surfaces of said heating tube and said pump, said last-mentioned heat conductive connection being only to the pump chamber portion of said pump at an outer peripheral exterior wall surface region thereof which is below the liquid level in said absorber to promote expulsion of vapor from solution in said pump and effect upward flow of solution in said riser pipe when the supply of vapors to said chamber from said boiler member is reduced and ineffective to circulate solution in said pump by vapor-lift action, especially when said boiler member is depleted of absorption solution and ineffective to supply vapor to said pump chamber when heating of said boiler member is resumed following a shut-down period.

7. In an absorption refrigeration system having a vapor supply line, a circuit for circulation of absorption solution including an absorber and a vapor expulsion unit comprising a pair of vertically extending pipes having the exterior wall surfaces thereof heat conductively connected to one another, one of said pipes forming a boiler member and the other serving as a heating tube, a standpipe communicating with said boiler member and the vapor supply line, respectively, a pump for raising liquid which is disposed alongside of and exteriorly of said heating tube, said pump comprising means forming a pump chamber and a riser pipe extending upwardly therefrom whose upper end communicates with the vapor space of said standpipe, first conduit means connecting the outlet of said absorber and said pump chamber for conducting absorption solution by gravity to the latter, second conduit means for conducting vapor expelled from absorption solution in said boiler member to said chamber to raise solution therefrom through said riser pipe by vapor-lift action, said first conduit means providing a path for conducting absorption solution by gravity from the outlet of said absorber only to said pump when expulsion of vapor from solution in said boiler member is substantially terminated due to reduction in the supply of heat thereto, and a heat conductive connection between the outer exterior wall surface of said heating tube and only a part of the outer exterior wall surface of said pump along a vertically extending zone at an outer peripheral region of the latter which is below the liquid level in said absorber.

8. Structure as set forth in claim 7 in which said pump chamber is spaced from said heating tube and serves as an analyzer and a portion of said riser pipe constitutes the part of said pump whose exterior wall surface is heat conductively connected to the exterior wall surface of said heating tube.

9. Structure as set forth in claim 7 in which the liquid containing portion of said pump chamber constitutes the part of said pump whose outer peripheral wall surface is heat conductively connected to the exterior wall surface of said heating tube.

10. Structure as set forth in claim 7 in which said standpipe is disposed within said boiler member and raised solution conducted thereto passes from the lower open end thereof into said boiler member.

11. Structure as set forth in claim 7 including provisions for employing said heating tube to effect heating of solution flowing through said standpipe to said boiler member so as to expel vapor therefrom, said standpipe providing a path of flow for such vapor which communicates with said vapor supply line and by-passes said pump.

12. Structure as set forth in claim 7 in which said second conduit means provides the only path of flow through which vapors can pass from the vapor space of said boiler member.

13. Structure as set forth in claim 7 in which an upright section of piping defines a casing having a partition therein, the part of said casing above said partition forming said boiler member and the part thereof below said partition serving as said pump chamber, said riser pipe extending upwardly within said shell through said partition.

14. Structure as set forth in claim 13 in which said standpipe, into which raised solution is introduced from the upper end of said riser pipe, is disposed within said shell, said standpipe having the lower open end thereof communicating with the boiler portion of said casing.

15. Structure as set forth in claim 14 in which the exterior wall surface of said heating flue is heat conductively connected to the exterior wall surface of said casing at the liquid containing portions thereof above and below said partition, respectively.

16. In an absorption refrigeration system of a uniform pressure type having a vapor supply line, a circuit for circulation of absorption solution including an absorber and a vapor expulsion unit comprising a pair of vertically extending pipes having the exterior wall surfaces thereof heat conductively connected to one another, one of said pipes forming a boiler member and the other serving as a heating tube, a standpipe communicating with said boiler member and the vapor supply line, respectively, a pump for raising liquid which is disposed alongside of and exteriorly of said heating tube, said pump comprising means forming a pump chamber and a vertical riser pipe extending downwardly into such chamber and having the upper end thereof communicating with the vapor space of said standpipe, first conduit means connecting the outlet of said absorber and said pump for conducting absorption solution by gravity to the latter, second conduit means for conducting vapor expelled from absorption solution in said boiler member to a region of said chamber above the liquid surface level maintained therein during operation of the system for normally raising solution by vapor-lift action through said riser pipe, said first conduit means providing a path for conducting absorption solution by gravity from the outlet of said absorber only to said pump when expulsion of vapor from solution in said boiler member is substantially terminated due to reduction in the supply of heat thereto, said standpipe being disposed within said boiler member, and said standpipe at the lower end thereof communicating with said boiler member and providing a passage in which raised solution from said riser pipe flows downwardly therethrough into said boiler member and then upwardly in the annular space formed between said standpipe and said boiler member.

References Cited in the file of this patent

UNITED STATES PATENTS

| | | |
|---|---|---|
| 1,791,441 | Bertsch | Feb. 3, 1931 |
| 2,215,674 | Ullstrand | Sept. 29, 1940 |
| 2,257,986 | Soroka | Oct. 7, 1941 |
| 2,282,684 | Taylor | May 12, 1942 |
| 2,306,199 | Ullstrand | Dec. 22, 1942 |
| 2,321,060 | Ashby | June 8, 1943 |
| 2,324,810 | Ashby | July 20, 1943 |
| 2,337,653 | Ehnbom | Dec. 28, 1943 |
| 2,507,624 | Edel | May 16, 1950 |
| 2,623,366 | Edel | Dec. 30, 1952 |